US012028458B2

(12) United States Patent
Vaziri et al.

(10) Patent No.: US 12,028,458 B2
(45) Date of Patent: Jul. 2, 2024

(54) SYSTEMS AND METHODS FOR USER IDENTITY

(71) Applicant: Blockpass UK Ltd, London (GB)

(72) Inventors: Adam Vaziri, Central (HK); Thomas Leiritz, Central (HK); Hoang Ngoc Toan, Ho Chi Minh (VN)

(73) Assignee: Blockpass UK Ltd, London (GB)

( * ) Notice: Subject to any disclaimer, the term of this patent is extended or adjusted under 35 U.S.C. 154(b) by 327 days.

(21) Appl. No.: 16/131,497

(22) Filed: Sep. 14, 2018

(65) Prior Publication Data

US 2019/0081794 A1    Mar. 14, 2019

(30) Foreign Application Priority Data

Sep. 14, 2017 (GB) ...................... 1714824

(51) Int. Cl.
*H04L 9/32* (2006.01)
*H04L 9/06* (2006.01)
*H04L 9/40* (2022.01)
*H04L 67/1061* (2022.01)
*H04L 9/00* (2022.01)

(52) U.S. Cl.
CPC .......... *H04L 9/3236* (2013.01); *H04L 9/0637* (2013.01); *H04L 9/3239* (2013.01); *H04L 9/3247* (2013.01); *H04L 63/102* (2013.01); *H04L 63/126* (2013.01); *H04L 67/1065* (2013.01); *H04L 9/50* (2022.05)

(58) Field of Classification Search
CPC ... H04L 9/3236; H04L 9/0637; H04L 9/3239; H04L 9/3247; H04L 63/102; H04L 63/126; H04L 67/1065; H04L 2209/38
See application file for complete search history.

(56) References Cited

U.S. PATENT DOCUMENTS

| | | |
|---|---|---|
| 8,788,836 B1 | 7/2014 | Hernacki et al. |
| 10,298,396 B1* | 5/2019 | Kurani ................. H04L 9/3226 |
| 10,362,009 B2* | 7/2019 | Faynberg .............. H04L 63/061 |
| 2014/0245020 A1* | 8/2014 | Buldas .................. H04L 9/3265 |
| | | 713/177 |

(Continued)

FOREIGN PATENT DOCUMENTS

| | | |
|---|---|---|
| EP | 3413507 A1 | 12/2018 |
| WO | 2016/179334 A1 | 11/2016 |
| WO | 2018/070848 A1 | 4/2018 |

OTHER PUBLICATIONS

UK Intellectual Property Office, Patents Act 1977: Search Report under Section 17(5), GB1714824.8, dated Mar. 14, 2019.

*Primary Examiner* — Lynn D Feild
*Assistant Examiner* — Vladimir I Gavrilenko
(74) *Attorney, Agent, or Firm* — Reichel Stohry Dean LLP; Mark C. Reichel; Natalie J. Dean

(57) ABSTRACT

When a user signs-in to a service provider such as a cryptocurrency exchange, the user must undergo a lengthy validation process that involves submitting copies of identity documents or utility bills. Each such service provider requires the same type of documents, and this therefore leads to repetition, inefficiency, loss of time and/or loss of profit when multiple service providers are consulted. The present invention, allows a user's identity to be established before multiple service providers with only one manual validation.

3 Claims, 1 Drawing Sheet

(56) References Cited

U.S. PATENT DOCUMENTS

| | | | |
|---|---|---|---|
| 2016/0180343 A1* | 6/2016 | Poon | H04L 63/0861 |
| | | | 705/44 |
| 2017/0109735 A1* | 4/2017 | Sheng | H04L 9/3297 |
| 2017/0366353 A1* | 12/2017 | Struttmann | G06F 21/64 |
| 2019/0163883 A1* | 5/2019 | Savanah | H04L 67/104 |
| 2019/0164137 A1* | 5/2019 | Vincent | G06Q 20/308 |
| 2020/0145219 A1* | 5/2020 | Sebastian | H04L 9/50 |
| 2020/0186355 A1* | 6/2020 | Davies | H04L 9/0643 |

* cited by examiner

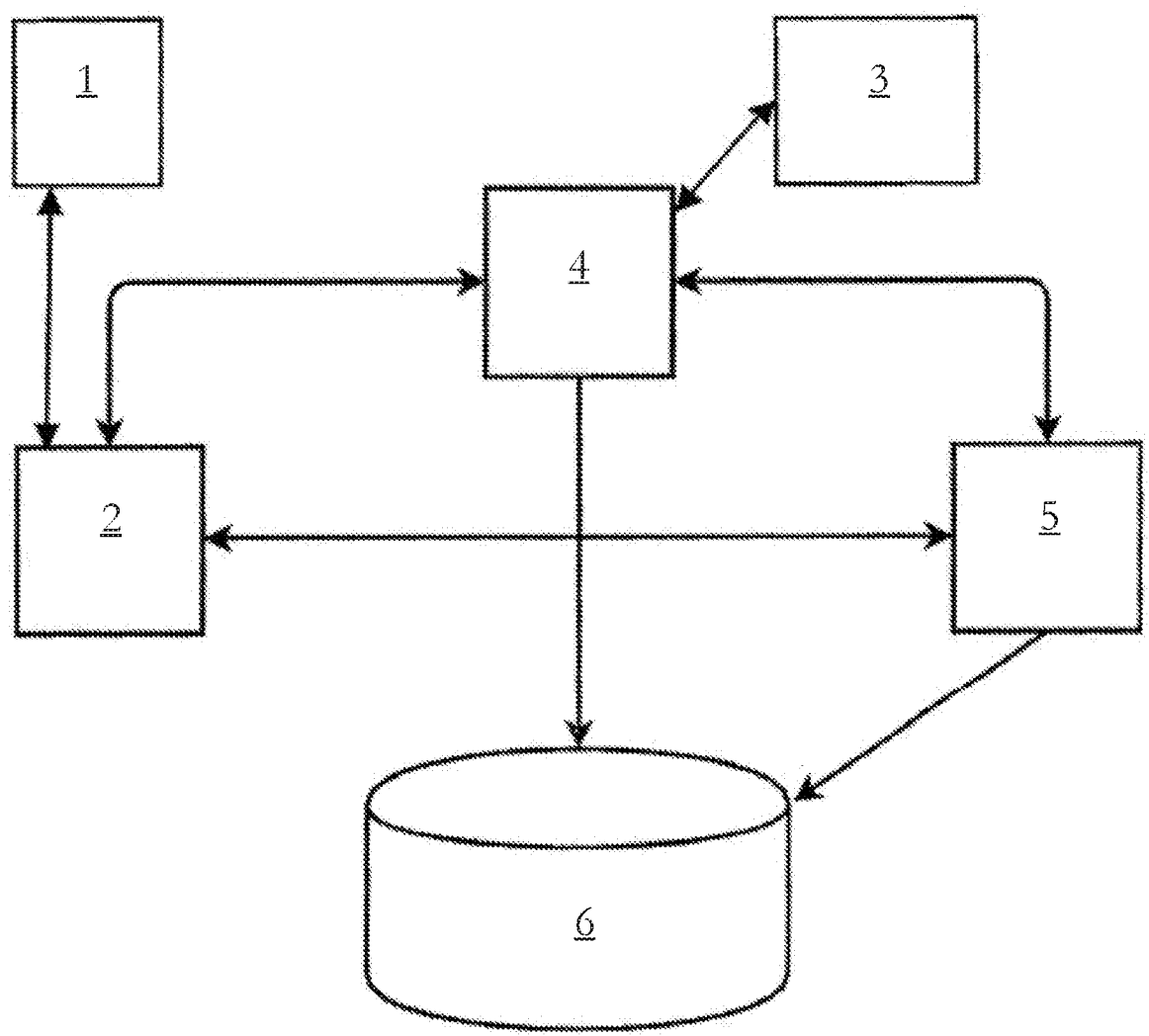

SYSTEMS AND METHODS FOR USER IDENTITY

PRIORITY

This application is related to and claims the priority benefit of Great Britain Patent Application Serial No. 1714824.8, filed Sep. 14, 2017. The contents of the foregoing application are hereby incorporated by reference in its entirety into this disclosure.

FIELD

The present invention relates generally to a system and a method of establishing user identity and finds particular, although not exclusive, utility in the application of KYC (Know Your Customer or Client) principles in relation to AML (Anti Money Laundering) regulations, amongst others.

BACKGROUND

One problem faced by users is that, when they sign-in to a service provider such as (but not limited to) a cryptocurrency exchange, the user must undergo a lengthy validation process that involves submitting copies of identity documents or utility bills. Each such service provider requires the same type of documents, and this therefore leads to repetition, inefficiency, loss of time and/or loss of profit when multiple service providers are consulted.

BRIEF SUMMARY

According to a first aspect of the present invention, there is provided a method of establishing user identity, the method comprising the steps of: forwarding verification data from a user to a server; creating a cryptographic hash of the data verification data; returning a package of the verification data to the user without retaining the verification data on the server; and subsequently, using that package to confirm the identity of the user by reference to the cryptographic hash.

In this way, identity management systems and methods may be provided in which blockchain accounts are associated with real-world identities in a correct, secure and/or efficient manner.

Forwarding verification data may comprise sending said data over a communications network, for example a telecommunications network such as a mobile telecommunications network and/or the Internet. Sending data may comprise sending said data via a computing device, such as a mobile computing device and/or table computer. Sending data may comprise using an application running on the computing device.

Verification data may comprise a Privately Identifiable Document (PID) such as a copy of an identity document (e.g. passport, driving license, etc.) and/or utility bill, bank statement, etc.

The server may comprise a digital computer device.

The package of the verification data may comprise the verification data, and may include one or more pieces of additional data. The package of verification data may be encrypted, for example, the package of verification data may be encrypted with a public key of the user.

Returning the package of verification data back to the user may comprise sending the package over a communications network, as discussed above.

Without retaining the verification data on the server may comprise deleting and/or otherwise removing the verification data from the server, any associated backups, and/or volatile and/or non-volatile memories.

Subsequently may refer to performing the following step after only one, at least one, or all of the preceding steps.

Using that package to confirm the identity of the user by reference to the cryptographic hash may comprise creating a further hash of the verification data and comparing that further hash with the first cryptographic hash created.

The cryptographic hash may be recorded in a distributed ledger. The distributed ledger may comprise a public distributed ledger. The distributed ledger may comprise a blockchain, a distributed hash table and/or a similar distributed ledger.

The method may further comprise any one or more of the features disclosed in the accompanying description, claims and/or drawing, in any combination.

According to a second aspect of the present invention, there is provided a system for establishing user identity, the system configured to perform the method according to the first aspect.

The system and/or any components thereof may comprise at least one computing device that may comprise at least one computer processor, at least one computer program and/or at least one computer program code. For instance, it and/or they may be embodied in software. In particular the or each computer program may be run on the at least one computing device and/or the or each computer program may comprise the computer program code. The system may comprise at least one computer-readable-medium having non-transitory software instructions stored therein. The system may be stored on at least one computer-readable memory.

The system may comprise an application installed upon a computing device, such as a mobile phone. The application may be configured to provide a user interface between the user and the server.

The server may also be configured to communicate with a distributed ledger (e.g. blockchain), which may be via a blockchain node. The server may be operated by an operator. The operator may be a human agent.

The server may be further configured to communicate with a service provider via a service server. The service server may be configured to communicate with the application.

The application may be downloadable from an application store associated with the operating system of the user's computing device.

The application may be configured to generate a private and public key pair.

The server may be configured to instruct a Blockchain Smart Contract (BSC) to generate new Unique Identifier associated with the user.

The user may sign the verification data using a private key. The server may check the digital signature of the verification data against a corresponding public key of the user. The operator may validate the verification data.

The operator may store a Document Verification Audit Trail (DVAT), which contains all the logs of queries to specialised KYC/AML/Anti-Terrorist Financing databases. The operator may instruct the server to write a proof of validation onto the Blockchain.

The method may further comprise creating a Blockchain identity entry.

The system may further comprise a Blockchain Smart Contract.

The method may further comprise associating the cryptographic hash with the Blockchain identity entry.

The method may further comprise the user making a request to a service provider, for example using the application to communicate with a service provider's server.

The service provide may checks the Blockchain Smart Contract (BSC) to see if the user has already had verification data validated and/or verified by the operator. The service provider may send a Blockchain transaction to BSC as notification that it wants to onboard the user, and may sends a payment in PASS tokens to the BSC.

In response, the server may wait for the blockchain transactions to complete and checks if payment was successful. The server may then instruct the user/application to send the package of the verification data, optionally in an encrypted form, to the service provider (for instance using the public key to the service provider), and the user/application may carry out this step.

The server may send a copy of the DVAT to the service provider, again optionally encrypted (e.g. to the Service Server's public key).

The service provide may then check the contents of the package of the verification data against the BSC stored HASH.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

FIG. 1 is block diagram of an identity management system.

DETAILED DESCRIPTION

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein. Likewise, method steps described or claimed in a particular sequence may be understood to operate in a different sequence.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other. For instance, wireless connectivity is contemplated.

The word "preferable" (or any of its derivatives) indicates one feature or more that is preferred but not essential.

All or any of the features disclosed in this specification (including any accompanying claims, abstract and drawings), and/or all or any of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving he same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any one embodiment or aspect of the invention may be combined in any suitable manner with any other particular feature, structure or characteristic of another embodiment or aspect of the invention, as would be apparent to one of ordinary skill in the art from this disclosure, in one or more embodiments or aspects.

Similarly, it should be appreciated that in the description various features of the invention are sometimes grouped together in a single embodiment, FIGURE, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances. The use of the term "any" may mean "all" and/or "each" in certain circumstances.

Furthermore, where applicable, the detailed descriptions hereof utilize (at least in part) algorithms, which may be described in terms of symbolic representations of operations on data bits within computer memory representing alphanumeric characters or other information. As described herein, a computing system or device (such as a data centre, smartphone, tablet, phablet, camera, etc.) generally includes a processor for executing instructions and memory for storing instructions and data. When a computing system or device has a series of machine encoded instructions stored in its (or accessible) memory, the computing system or device operating on such encoded instructions may become a specific type of machine, namely a computer particularly configured to perform the operations embodied by the series of instructions. Some of the instructions may be adapted to produce signals that control operation of other machines and thus may operate through those control signals to transform materials far removed from the computing system/device itself.

An algorithm is here, and generally, conceived to be a self-consistent sequence of steps leading to a desired result. These steps may require physical manipulations of physical quantities. Usually, though not necessarily, these quantities take the form of electrical or magnetic pulses or signals capable of being stored, transferred, transformed, combined, compared, and otherwise manipulated. It proves convenient at times, principally for reasons of common usage, to refer to these signals as bits, values, symbols, characters, display data, terms, numbers, or the like as a reference to the physical items or manifestations in which such signals are embodied or expressed. It should be kept in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems and are not accessible except through software systems. Data structures are not the information content of a memory, but rather represent specific electronic structural elements that impart or manifest a physical organization on the information stored in memory. More than mere abstraction, the data structures are specific electrical or magnetic structural elements in memory which simultaneously represent complex data accurately, often data modelling physical characteristics of related items, and provide increased efficiency in computer operation.

Further, some manipulations performed may be referred to in terms commonly associated with mental operations performed by a human operator (such as "determining" or "analysing"). No such capability of a human operator is necessary, or desirable in most cases, in any of the operations described herein which form part of the embodiments of the present application; the operations are machine operations. Indeed, a human operator could not perform many of the machine operations described herein due to the networking, concurrent audio-visual recording, and vast quantity of data that may be at play in the present disclosure. This is especially true with respect to the operations that provide data aggregation, analysis, collation, and filtering techniques.

As previously noted, useful machines for performing the operations of one or more embodiments hereof include general purpose digital computers, microprocessors, smartphones, tablets, phablets, internet enabled cameras, or any other form of personal computing device handheld or otherwise mobile devices. In all cases the distinction between the method operations in operating a computing device and the method of computation itself should be recognized. One or more embodiments of the present disclosure relate to methods and apparatus for operating a computing device in processing electrical or other (e.g., mechanical or chemical) physical signals to generate other desired physical manifestations or signals.

The computing devices, data centres, and systems described herein may operate on one or more software modules and/or applications, which are collections of signals stored on a media that represent a series of machine instructions that enable the processor to perform the machine instructions that implement the algorithmic steps. Such machine instructions may be the actual computer code the processor interprets to implement the instructions, or alternatively may be a higher level of coding of the instructions that is interpreted to obtain the actual computer code. The software module or application may also include a hardware component, wherein some aspects of the algorithm are performed by the circuitry itself rather as a result of an instruction.

The principles of the invention will now be described by a detailed description of at least one drawing relating to exemplary features. It is clear that other arrangements can be configured according to the knowledge of persons skilled in the art without departing from the underlying concept or technical teaching, the invention being limited only by the terms of the appended claims.

It is to be understood that the various features that are described in the following and/or illustrated in the drawing are preferred but not essential. Combinations of features described and/or illustrated are not considered to be the only possible combinations. Unless stated to the contrary, individual features may be omitted, varied or combined in different combinations, where practical.

FIG. 1 is block diagram of an identity management system (the Blockpass System) with which a user (1) may interact. The system comprises an application (App) installed upon a mobile phone (2). The application may be compatible with more than one mobile operating system, for example iOS (RTM), Android (RTM) and/or Windows Phone (RTM). The application will provide a user interface between the user (1) and the Blockpass System.

The mobile phone (2) is configured to communicate with a Blockpass Server (4) to enable to application to send user documents to the Blockpass Server (4). The Blockpass Server (4) is also configured to communicate with a distributed ledger (Blockchain) via a Blockchain node (6). The Blockpass Server (4) is operated by an Operator (3); that is, a human agent appointed to validate user documents and instruct the Blockpass Server (4) to write a proof of validation onto the Blockchain.

The Blockpass Server (4) is further configured to communicate with a Service Server (5), to facilitate communication between a user (1) and a service provider operating the Service Server (5). To 'onboard' a new customer, the Service Server (5) communicates with the application on the mobile phone (2) to receive an instruction on behalf of the user (1), communicates with the Blockpass Server (4) to receive an encrypted documents package from the application on the mobile phone (2), and communicates with the Blockchain to check the integrity of the user documents.

A Blockpass Token (PASS) is a Blockchain token that is used as a method of payment for services provided by the Blockpass System.

Communications and/or transactions within the Blockpass System are governed by a set of rules embodied in a process Workflow.

An example of a Blockpass process Workflow is now described from the perspective of all parties involved as follows. The various steps are annotated in the form (x.y), where x identifies the party or component defined above and y is a method step:
- (1.1) a User (1) downloads the App from an application store associated with the operating system of the mobile phone;
- (2.1) upon start-up, the App generates a private and public key pair, called UserKey (UserPubKey, UserPrivKey);
- (1.2) the User (1) is asked to insert his/her email address and choose a password;
- (2.2) the App encrypts UserPrivKey with the provided password;
- (2.3) the App sends the email address and UserPubKey to the Blockpass Server (4);
- (4.1) the Blockpass Server (4) creates an association between the email address and UserPubKey; the association is stored on a Blockpass Server (4) database; the Blockpass Server (4) generates an email validation code and sends it to the email address;
- (2.4) the App asks the User (1) to insert the validation code;
- (1.3) the User (1) enters the validation code;
- (2.5) the App sends the validation code to the Blockpass Server (4);
- (4.2) the Blockpass Server (4) checks the validation code against the one generated and activates identity;
- (4.3) the Blockpass Server (4) instructs a Blockchain Smart Contract (BSC) to generate new Unique Identifier (UQID) associated with the User identity;
- (1.4) the User (1) chooses to validate his identity by submitting a Privately Identifiable Document (PID);
- (2.6) the App uses the UserPrivKey to compute a digital signature associated with the PID;
- (2.7) the App sends the PID, together with the digital signature to the Blockpass Server (4);
- (4.4) the Blockpass Server (4) checks the digital signature against the stored UserPubKey;
- (4.5) the Blockpass Server (4) assigns the identity validation to the Operator (3);
- (3.1) the Operator (3) validates the identity of the User based on the PID;
- (3.2) the Operator (3) stores a Document Verification Audit Trail (DVAT), which contains all the logs of queries to specialised KYC/AML/Anti-Terrorist Financing databases;
- (3.3) the Operator (3) instructs the Blockpass Server (4) to create a Blockchain identity entry;
- (4.6) the Blockpass Server (4) computes a cryptographic hash (HASH) of the PID;
- (4.7) the Blockpass Server (4) instructs the Blockchain Smart Contract to associate the HASH of the PID with the UQID;
- (4.8) the Blockpass Server (4) encrypts a Package of verification items with the UserPubKey and sends the encrypted Package back to the App;
- (4.9) the Blockpass Server (4) deletes all Privately Identifiable Document(s) from its custody;
- (1.5) the User (1), wanting to use a Service, makes a request to the Service Server (5) using the App;
- (5.1) the Service Server (5) checks the Blockpass Blockchain Smart Contract (BSC) to see if the User (1) has the required identity validation documents;
- (5.2) the Service Server (5) sends a Blockchain transaction to BSC as notification that it wants to onboard the User (1);
- (5.3) the Service Server (5) sends a payment in PASS tokens to BSC;
- (4.10) the Blockpass Server (4) waits for blockchain transactions to complete and checks if payment was successful;
- (4.11) the Blockpass Server (4) instructs the App to send the Package encrypted to the Service Server's (5) public key to the Service Server (5);
- (2.8) the App executes the Blockpass Server (4) instruction and delivers the Package to the Service Server (5);
- (4.12) the Blockpass Server (4) sends a copy of the DVAT to the Service Server (5) encrypted to the Service Server's public key;
- (5.4) the Service Server (5) checks the contents of the Package against the BSC stored HASH; and
- (5.5) the Service Server (5) then has all the KYC/AML (or similar) data it needs to onboard the User.

In this specification, systems and methods for establishing, defining and maintaining the representation of a user identity onto a system based on distributed ledger technology or blockchain are disclosed. For the first time, the end user will be in full control of his private data related to his identity. By using the immutability property of the blockchain and cryptographic hash functions, the user can prove to a service provider that a KYC/AML verification service has already performed all the necessary checks and his data is to be directly trusted and accepted.

Thus, KYC/AML or other identification requirements may be met without retaining personal data. Embodiments of the invention may provide full verification of individuals (KYC etc), including video identification; once verified, a data packet is delivered to the device of the individual who has been verified; data is hashed before sending (seal effect); data is then deleted off system servers apart from the hash; the individual sends data to, for example, a bank or a bitcoin exchange from their Blockpass application; the bank etc then checks with the Blockpass organisation whether the 'seal' has been broken. Such systems and methods may achieve data protection for individuals, with it being impossible to hack Blockpass and extract data. This is a privacy by design system to provide a full KYC (etc) verification process with the user in control of their own data.

While various embodiments of systems and methods for user identity the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A method of establishing user identity, the method comprising the steps of:
   receiving, by the first server, a first public key of a generated first private and first public key pair associated with a user;
   receiving from a user device, by a first server, verification data, wherein the verification data comprises personal identity documentation associated with an identity of a user and is for verifying the identity of the user;
   receiving, by the first server, a digital signature for the verification data created using the first private key;
   validating, by an operator, the identity of the user based on the verification data, generating, by the operator, a corresponding document verification audit trail, and storing, by the operator, the document verification audit trail;
   computing, by the first server, a first cryptographic hash of the verification data;
   recording, on a blockchain, the first cryptographic hash of the verification data, wherein the cryptographic hash is associated with the user;
   encrypting, by the first server, the verification data into an encrypted package using the first public key;
   transmitting, by the first server, the encrypted package to the user device only, for decryption by the first private key;
   deleting, by the first server, all copies of the verification data and the encrypted package from the non-volatile storage of the server;
   responsive to a request in the form of a completed blockchain transaction along with identification of a successful payment, the first server transmitting the document verification audit trail to a second server and the first server instructing the user device to transmit the package of decrypted verification data to the second server encrypted using a second public key, wherein the second public key is for encrypting data such that it is decryptable with a second private key; and
   computing, by the second server, a second cryptographic hash of the verification data, and comparing the second cryptographic hash with the first cryptographic hash on the blockchain.

2. A system for establishing user identity, the system comprising a computing device with a computer processor configured to perform the method of claim 1.

3. A non-transitory computer-readable medium having stored thereon software instructions that, when executed by a processor, cause the processor to:
   receive a first public key of a generated first private and first public key pair associated with a user;
   receive verification data, wherein the verification data comprises personal identity documentation associated with an identity of a user and is for verifying the identity of the user;
   receive a digital signature for the verification data created using the first private key;
   validate the identity of the user based on the verification data, generate a corresponding document verification audit trail, and store the document verification audit trail;
   compute a first cryptographic hash of the verification data;
   record, on a blockchain, the first cryptographic hash of the verification data, wherein the first cryptographic hash is associated with the user;
   encrypt the verification data into an encrypted package using the first public key;
   transmit the encrypted package to a user device for decryption by the first private key;
   delete all copies of the verification data from non-volatile storage;
   responsive to a request in the form of a completed blockchain transaction along with identification of a successful payment, transmit the document verification audit trail to a server and instruct the user device to transmit the decrypted package of verification data to the server; and
   compute a second cryptographic hash of the verification data, and compare the second cryptographic hash with the first cryptographic hash on the blockchain.

* * * * *